Figure 4:
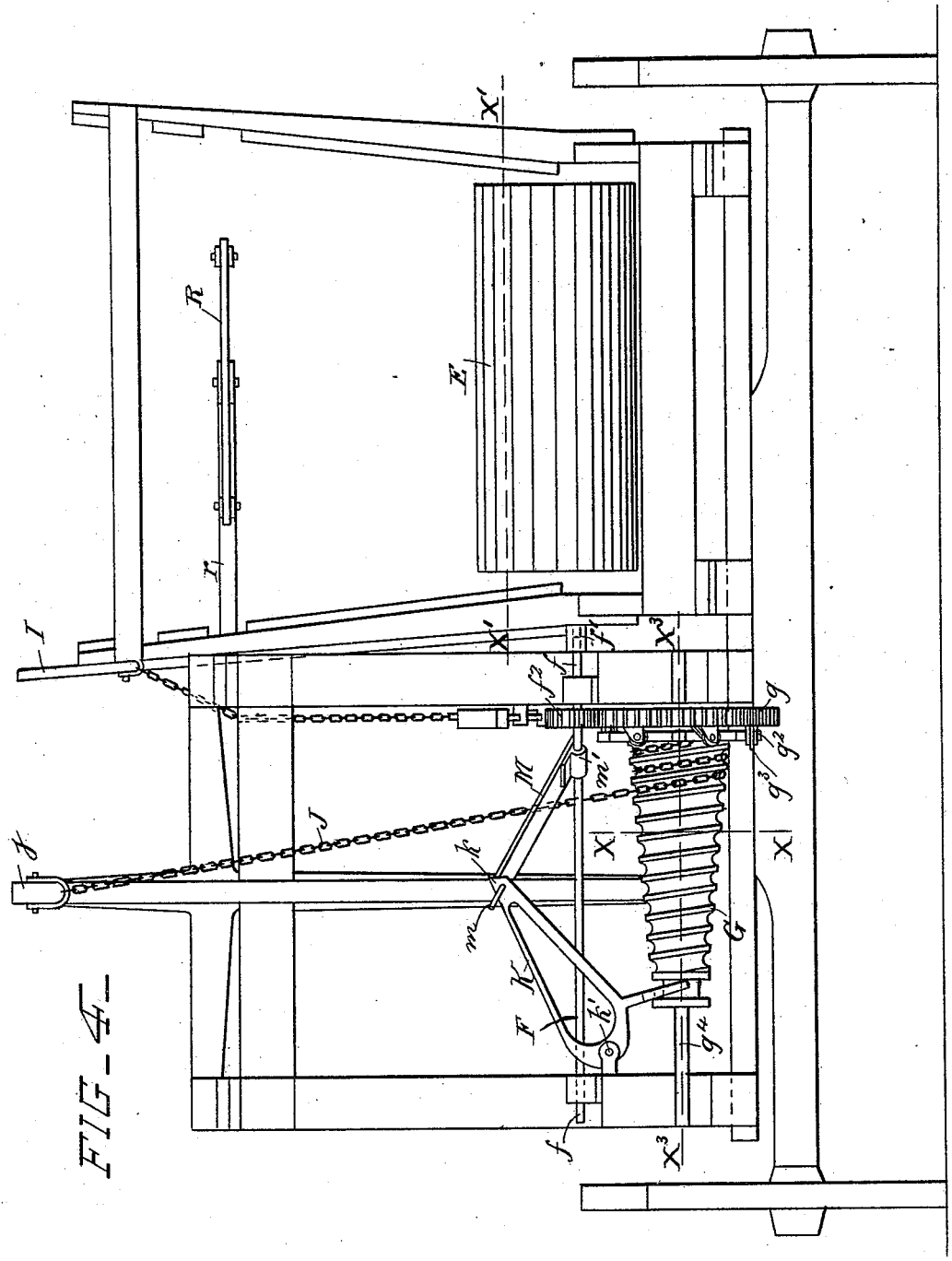

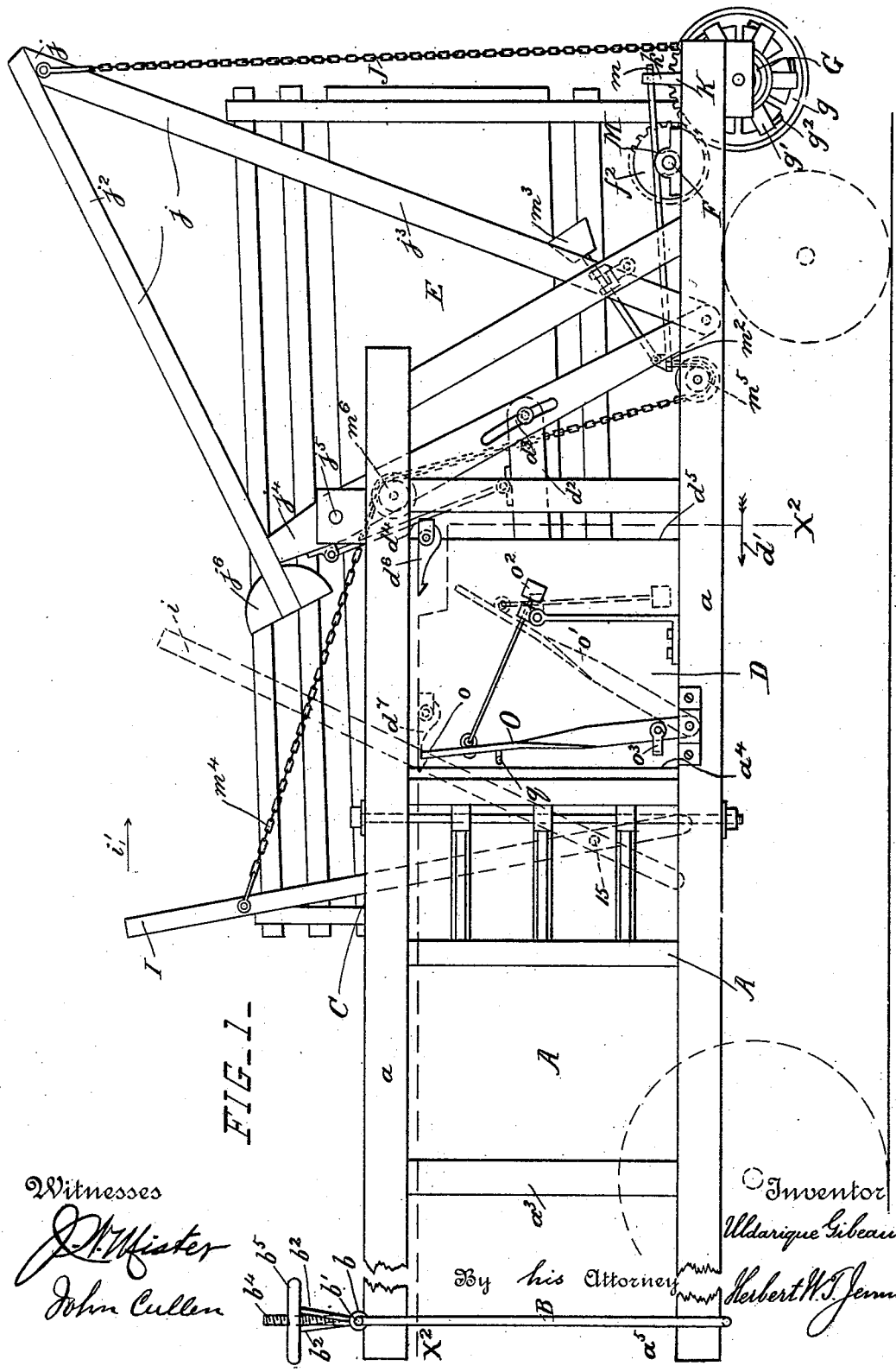

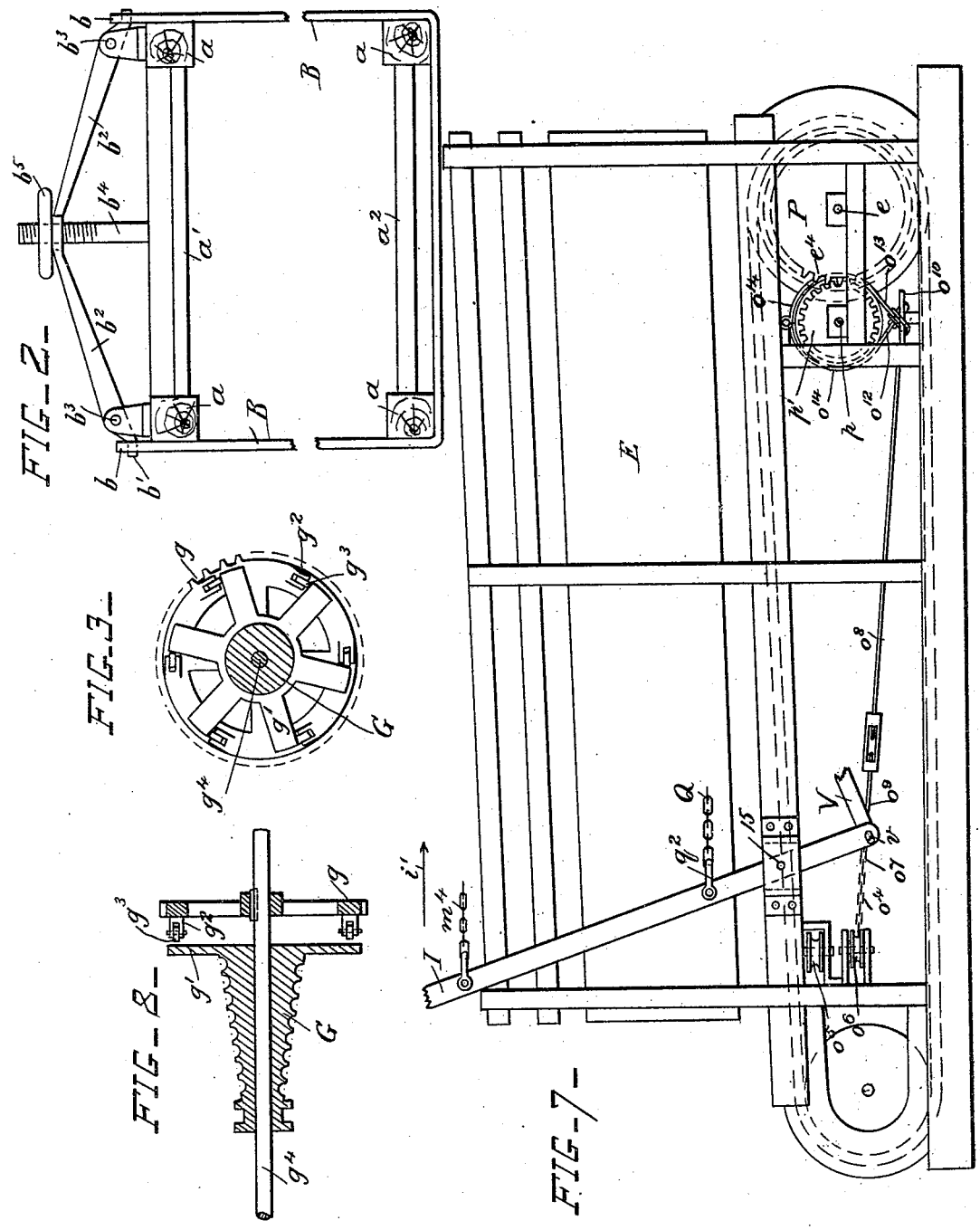

(No Model.) 4 Sheets—Sheet 3.

U. GIBEAULT.
HAY PRESS.

No. 471,113. Patented Mar. 22, 1892.

Witnesses
J. W. Pfister
John Cullen

Inventor
Uldarique Gibeault.
By his Attorney
Herbert W. T. Jenner.

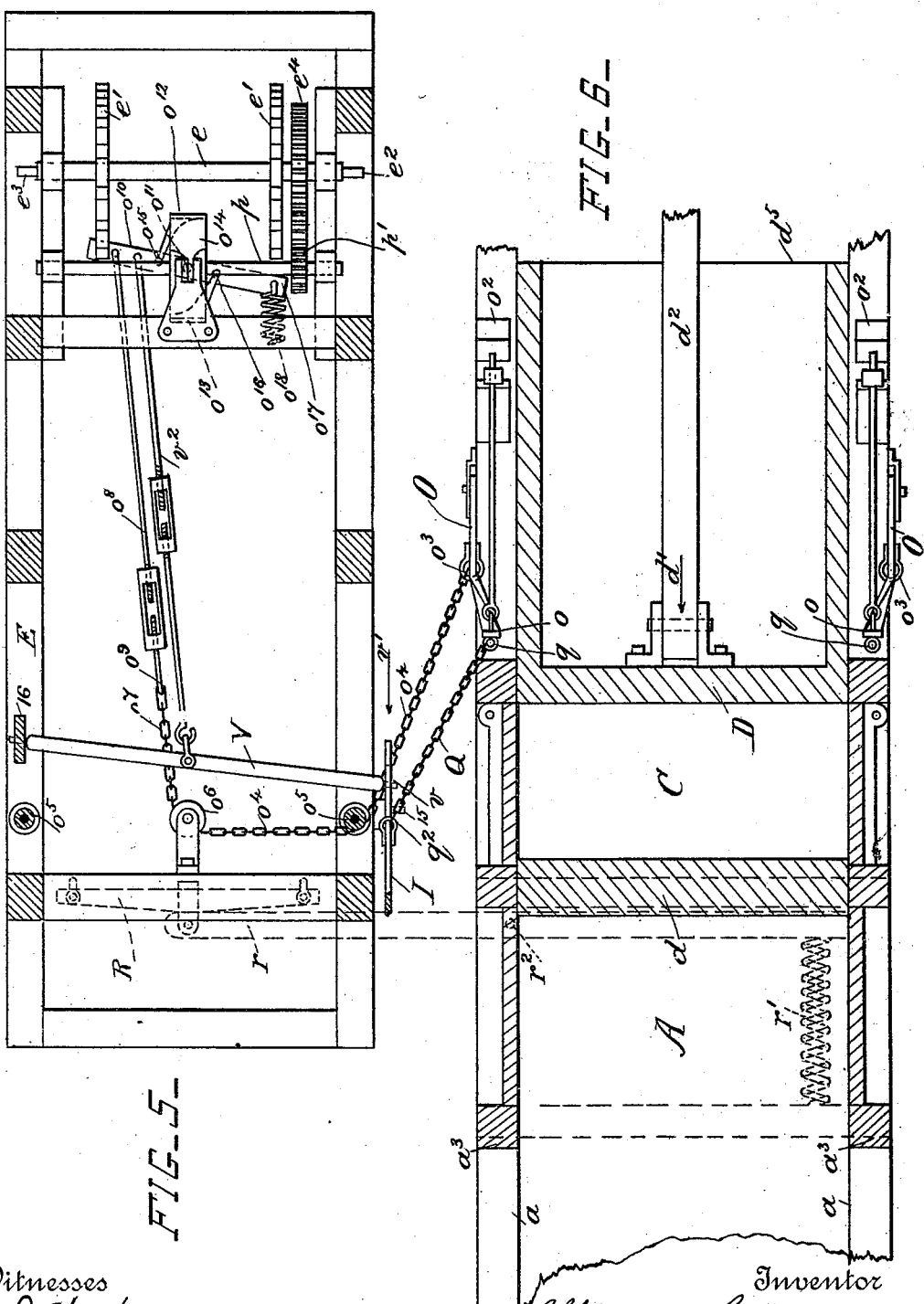

UNITED STATES PATENT OFFICE.

ULDARIQUE GIBEAULT, OF ST. ISIDORE JUNCTION, CANADA.

HAY-PRESS.

SPECIFICATION forming part of Letters Patent No. 471,113, dated March 22, 1892.

Application filed February 19, 1891. Serial No. 382,063. (No model.)

*To all whom it may concern:*

Be it known that I, ULDARIQUE GIBEAULT, a citizen of the Dominion of Canada, residing at St. Isidore Junction, in the county of Laprairie and Province of Quebec, Canada, have invented certain new and useful Improvements in Hay-Presses; and I do hereby declare the following to be a full, clear, and exact description of the invention, such as will enable others skilled in the art to which it appertains to make and use the same.

My invention has reference to that class of hay-presses which are operated by an ordinary horse-power and in which the hay is pressed by the action of a square piston working in a square box and pressing the hay against blocks inserted into this box at each bale.

My invention has for its object to provide a hay-press of more rapid operation and taking less hands to attend to it.

Referring to the drawings, similar letters and figures refer to similar parts throughout the several views.

Figure 1 is a side elevation of my invention. Fig. 2 is a back end view of the hay-press; Fig. 3, a section through line X X of Fig. 4; Fig. 4, a front end view of my hay-press and horse-power; Fig. 5, a section through line X' X' of Fig. 4; Fig. 6, a section through line $X^2$ $X^2$ of Fig. 1. Fig. 7 is a side elevation of my horse-power, and Fig. 8 a section through line $X^3$ $X^3$ of Fig. 4.

A is the frame of my press, composed of the four longitudinal pieces $a$, well braced together, and having its top and bottom covered in, as shown at $a^4$ and $a^2$ in Fig. 2, also the sides from $a^3$ to $a^4$, as shown in Figs. 1 and 6, this forming the box of the press, which, however, is not new, and consequently will not be minutely described.

The back portion of my press is left open at the sides from $a^3$ to $a^5$, as in some other presses, differing simply from them by the suppression of a post which is usually inserted at $a^5$ on either side and made to brace the top and bottom together. My reason for omitting this post is to be able to slightly approach the top and bottom by means of the rod B, passing around under the press and having its two extremities terminated with eyes at $b$, into which pass the extremities $b'$ of the levers $b^2$, fulcrumed at $b^3$ and placed on either side of the screw $b^4$, which is firmly secured to the top $a'$, and onto which is screwed the hand-wheel $b^5$ or any other suitable lever, so that when it is screwed down the portions $a'$ and $a^2$ of my press approach toward each other, this having for its object to augment the friction on the blocks inserted into the box, as described hereinafter, when it is required to press the hay very hard, and by unscrewing the hand-wheel $a^5$ the portions $a'$ and $a^2$, retaking their normal positions, relieve the blocks of a portion of the friction when it is required to press the hay only moderately hard.

Now the hay is inserted through an opening placed in the top $a'$ opposite C and exactly at the end of the piston D when the latter is at the forward end of its stroke, as shown in Fig. 6, having previously inserted through the same opening a block $d$, so that when the piston moves ahead in the direction shown by the arrow $d'$ the hay is pressed up against the block $d$; but, as the latter is made so as to pass through the box H, by being forced to do so, the friction on its sides being augmented or diminished at will by the arrangement operated by the hand-wheel $b^5$ and just described; it also moves ahead some, and on the piston returning to the position shown in Figs. 1 and 6 more hay is inserted between the piston and hay put in previously and the piston again advances. This operation is repeated continuously, blocks $d$ being inserted at each bale length. However, the above operation is not new, but is only explained so as to render the following comprehensive.

To give the piston D its reciprocating motion, I make use of an ordinary horse-power E, which is placed next to the press, as shown in Fig. 4, and mounted on the same wheels, so that the whole is compact and can be drawn round where desired with horses. The power is transmitted by the main shaft $e$ of the front tread-wheels $e'$, its two ends $e^2$ and $e^3$ being square. On the other hand, the main shaft F of my press has also two other extremities $f$ square, so that, the two shafts being placed exactly opposite one another and in the same line, I insert the hollow sleeve $f'$, which exactly fits on the square ends of the shafts $e$.

and F and make them practically form one. Consequently when the horse-power E is started the shaft F revolves with the one $e$, the one F being provided with the gear-wheel $f^2$, which drives the drum G through the medium of the gear-wheel $g$, with which it is coupled.

Now, a certain amount of hay having been put into the box H of my press and the lever I being in the position shown in Fig. 1, the horse-power E is started and the drum G rotates, as just explained above, thus winding up the chain J, which pulls down the end $j$ of the triangular frame $j'$, composed of the pieces $j^2$, $j^3$, and $j^4$, the whole being fulcrumed at $j^5$, and the piece $j^2$, provided with the counter-weight $j^6$, the piston-rod $d^2$ being joined to the piece $j^4$, as shown in Fig. 1, its end $d^3$ being supported by the piece $d^4$, joined to the piece $j^4$. This pulling down of the end $j$ forces the piston D ahead in the direction of the arrow $d'$. However, the end $j$, continuing to be pulled down by the chain J, comes in contact with the end $k$ of the bell-crank K, which is fulcrumed at $k'$, and presses it down; but in so doing it forces the drum G away from the gear-wheel $g$, as can easily be seen by examining Figs. 4 and 8, the drum G being loose on the shaft $g^4$ until the radial arms $g'$, which form one with the drum G, slip away from the projections $g^2$, placed on the gear-wheel $g$, and which are provided with the small wheels $g^3$, so as to prevent the projection $g^2$ from catching onto the arms $g'$ when they are drawn away from the gear-wheel $g$; but at the same time, as the drum G is no more caused to turn by the horse-power E, the counter-weight $j^6$ pulls the end $j$ up into the position shown in Fig. 1, and in so doing unwinds the chain J and pulls out the piston D. When the end $j$ presses down the end $k$, it also presses down the end $m$ of the lever M, which is fulcrumed at $m'$ on the shaft F, this lever M having its end $m^2$ provided with the counter-weight $m^3$, arranged as clearly shown in Fig. 1, this having for its object to keep the lever M in whatever position it is forcibly put. On its end $m^2$ is also attached the chain $m^4$, which passes around the two pulleys $m^5$ and $m^6$, (shown in dotted lines in Fig. 1,) it being always tight. When the end $m$ is pushed down, it raises the end $m^2$ and pulls on the chain $m^4$, thus pulling the lever I forward, as shown at $i$ in dotted lines in Fig. 1, so that all there is to do when it is required to start the piston D again is to pull the lever I back, as shown in Fig. 1, thus putting the drum G into gear and starting the horse-power again, and so on continuously. However, when the drum G is drawn away from the gear-wheel $g$, as shown in Fig. 8, it suddenly relieves the horse-power, and it would run away and hurt the horses placed on it if I did not provide an automatic brake, which prevents this.

Referring to Fig. 1, it will be seen that on the end $d^5$ of the piston D, I place a catch $d^6$, made as there shown, so that when the piston D is pushed ahead this catch $d^6$ takes the position $d^7$ (indicated in dotted lines)—that is, it laps over the end $o$ of lever O, so that when the piston D returns to the position it occupies in Fig. 1 it pulls the end $o$ along with it and makes the lever O take the position $o'$. (Shown in dotted lines.) This lever O is provided with the counter-weight $o^2$ (which serves to keep it in any position in which it is forcibly put) and is arranged as shown in Figs. 1 and 6. Now onto the link $o^3$, which is attached to lever O, is joined the chain $o^4$, which passes around the pulleys $o^5$ and $o^6$, placed on the horse-power E, as shown in Fig. 5, and has its end $o^7$ attached to the adjustable bar $o^8$ at $o^9$, the other end of the bar $o^8$ being joined to the lever $o^{10}$, which is fulcrumed at $o^{11}$ and has the two ends $o^{12}$ and $o^{13}$ of the ordinary friction brake-band $o^{14}$ joined to it at $o^{15}$ and $o^{16}$, the other end $o^{17}$ of the lever $o^{10}$ being provided with the spring $o^{18}$, which serves to bring it back to its normal position. When taken out of it, the brake-band $o^{14}$ acts on the pulley P, which is mounted on the shaft $p$ with the gear-wheel $p'$, which is coupled with the gear-wheel $e^4$, mounted on the shaft $e$, so that when the brake is brought into action it stops the horse-power through the medium of the gear-wheels $p'$ and $e^4$. To relieve the brake, I attach a chain Q to the lever O at $q$ and join its other extremity to the lever I at $q^2$, so that when the lever I is pulled back to put the drum G into gear it also relieves the brake by pulling the lever O into the position shown in Fig. 1.

If it should be found necessary to apply the brake at any time, it can be done by merely pushing the lever I forward, as indicated by the arrow $i'$ in Figs. 1 and 7. The lever I is pivoted on the pin 15, as shown in Fig. 5, and its lower end engages with one end of the lever V, and the other end of the lever V is pivoted in a hole in the plate 16 on the other side of the horse-power. The forward motion of the lever I pushes the end $v$ of lever V in the direction $v'$, Fig. 5, thus pulling on the adjustable bar $v^2$, which is joined at $v^3$ to the brake-lever $o^{10}$.

My horse-power is so arranged as to be placed on either side of the hay-press proper. Consequently the lever O is duplicated on the other side of the press. Moreover, instead of making the horse or horses placed on the horse-power act merely by their weight I make them pull by harnessing them to the whiffletree R, which is attached to the lever $r$, the latter pressing against the spring $r'$ and being pivoted at $r^2$, Fig. 6 in dotted line.

Having described my invention, what I claim, and desire to secure by Letters Patent, is—

1. In a hay-press, the combination, with the operating-shaft $g^4$ and the wheel $g$, secured thereon and provided with projections $g^2$, of the sliding barrel provided with arms adapted to engage with the said projections, the pivoted bell-crank lever K, adapted to move the barrel endwise, the weighted lever M, the hand-lever I, a chain connecting the said levers M and I, the pivoted frame adapted to operate the press-piston and to strike the said levers K and M, and the chain connecting the said frame and barrel, substantially as set forth.

2. In a hay-press, the combination, with the reciprocating piston provided with the pivoted catch $d^6$, of the lever O, pivoted to the frame and adapted to be operated by the catch during the return movement of the piston, a horse-power provided with a brake-pulley on one of its shafts, the pivoted brake-lever $o^{10}$, the brake-strap connected to the brake-lever and bearing on the brake-pulley, and a rod and a chain operatively connecting the lever O with the brake-lever, substantially as set forth.

3. In a hay-press, the combination, with the hand-lever I for starting the press-piston-actuating mechanism, of a horse-power provided with a brake-pulley, the pivoted brake-lever $o^{10}$, the brake-strap, the pivoted lever V, adapted to be operated by the said lever I, and a rod connecting the lever V with the brake-lever, whereby the brake is released when the said hand-lever is moved to start the piston, substantially as set forth.

4. In a hay-press, the combination, with the press-box, the piston, and the pitman pivoted to the piston, of the pivoted triangular frame $j$, provided with a counter-weight for assisting the return of the piston and operatively connected with the said pitman, the link $d^4$, pivoted to the said frame and adapted to support the pitman, a revoluble barrel, and a chain connected to the said barrel for turning the said frame on its pivot, substantially as set forth.

In testimony whereof I have affixed my signature in presence of two witnesses.

ULDARIQUE GIBEAULT.

Witnesses:
ERN. LOIGNON,
ALPH. WALTER.